US009929564B2

(12) United States Patent
Zimmerly et al.

(10) Patent No.: US 9,929,564 B2
(45) Date of Patent: Mar. 27, 2018

(54) UTILITY PROVISIONING IN AN ENERGY RESOURCE SYSTEM

(71) Applicant: SolarCity Corporation, San Mateo, CA (US)

(72) Inventors: Brian Zimmerly, Oakland, CA (US); Ryan Hanley, Berkeley, CA (US)

(73) Assignee: SolarCity Corporation, San Mateo, CA (US)

( * ) Notice: Subject to any disclaimer, the term of this patent is extended or adjusted under 35 U.S.C. 154(b) by 309 days.

(21) Appl. No.: 14/794,389

(22) Filed: Jul. 8, 2015

(65) Prior Publication Data

US 2016/0344187 A1 Nov. 24, 2016

Related U.S. Application Data

(60) Provisional application No. 62/163,081, filed on May 18, 2015.

(51) Int. Cl.
*H02J 3/38* (2006.01)
*G06Q 30/02* (2012.01)
(Continued)

(52) U.S. Cl.
CPC .............. *H02J 3/381* (2013.01); *G05B 15/02* (2013.01); *G06Q 30/0283* (2013.01);
(Continued)

(58) Field of Classification Search
USPC .................................................. 700/286–297
See application file for complete search history.

(56) References Cited

U.S. PATENT DOCUMENTS 6,915,185 B2 * 7/2005 Yamamoto ............. G06Q 50/06
322/44
2002/0103655 A1 * 8/2002 Boies ............... G06Q 10/06375
700/291
(Continued)

OTHER PUBLICATIONS

U.S. Appl. No. 62/119,925, filed Feb. 24, 2015, to Peter Rive et al. "Scalable Hierarchical Energy Distribution Grid Utilizing Homogeneous Control Logic" (47 pages).
(Continued)

*Primary Examiner* — Robert Fennema
*Assistant Examiner* — Rajendra Khadka
(74) *Attorney, Agent, or Firm* — Kilpatrick Townsend & Stockton LLP (57) ABSTRACT

Embodiments may include a method of adjusting power in a distributed generation management system. The method may include receiving, by a processor, real-time load requirement data of an energy resources (ER) site. The method may also include receiving, by the processor, real-time energy generation (EG) data from the ER site. The method may further include determining, by the processor, a net power generation at a first level from the real-time load requirement data and the real-time energy generation data. The method may include receiving, by the processor, a first request from a utility to increase or decrease the net power generation from the first level. The method may also include determining a benefit complying with the first request. The method may further include estimating a benefit of not complying with the first request. The method may also include determining whether the determined benefit is greater than the estimated benefit.

21 Claims, 9 Drawing Sheets

(51) Int. Cl.
*G06Q 50/06* (2012.01)
*G05B 15/02* (2006.01)
*H02J 3/46* (2006.01)

(52) U.S. Cl.
CPC .............. *G06Q 50/06* (2013.01); *H02J 3/46*
(2013.01); *Y04S 10/54* (2013.01); *Y04S 50/14*
(2013.01)

(56) References Cited

U.S. PATENT DOCUMENTS

| | | | | |
|---|---|---|---|---|
| 2011/0055036 A1* | 3/2011 | Helfan | ................... | G06Q 30/04 |
| | | | | 705/26.1 |
| 2012/0004783 A1* | 1/2012 | Lo | ............................ | H02J 3/14 |
| | | | | 700/291 |
| 2012/0245744 A1* | 9/2012 | Prosser | .................... | H02J 3/46 |
| | | | | 700/286 |
| 2012/0323396 A1* | 12/2012 | Shelton | .................. | H02J 3/381 |
| | | | | 700/297 |
| 2013/0051106 A1* | 2/2013 | Kuo | .................... | H02M 7/5387 |
| | | | | 363/132 |
| 2013/0311236 A1* | 11/2013 | Takahashi | .............. | G06Q 50/06 |
| | | | | 705/7.31 |
| 2014/0025220 A1* | 1/2014 | Carlson | ............ | H01L 31/02021 |
| | | | | 700/296 |
| 2014/0129040 A1* | 5/2014 | Emadi | .................... | G06Q 50/06 |
| | | | | 700/291 |
| 2015/0314696 A1* | 11/2015 | Wang | .................. | B60L 11/1842 |
| | | | | 701/22 |
| 2015/0355606 A1* | 12/2015 | Chillar | ................ | G05B 13/021 |
| | | | | 700/286 |

OTHER PUBLICATIONS

U.S. Appl. No. 62/163,200, filed May 18, 2015, to Eric Daniel Carlson "Controlling a Distributed Generation Management System" (43 pages).
U.S. Appl. No. 14/697,353, filed Apr. 27, 2015, to Eric Daniel Carlson et al. "Failsafe Power Profile for a Distributed Generation Management System" (33 pages).

* cited by examiner

UTILITY PROVISIONING IN AN ENERGY RESOURCE SYSTEM

CROSS-REFERENCES TO RELATED APPLICATIONS

This application claims the benefit of priority to U.S. Provisional Application No. 62/163,081, filed May 18, 2015, is related to U.S. Provisional Application No. 62/119,925, filed Feb. 24, 2015, and is also related to U.S. Provisional Application No. 62/163,200, filed May 18, 2015, the contents of all of which are herein incorporated by reference for all purposes.

BACKGROUND

Energy generation (EG) systems may be part of a distributed generation system, where the EG systems are not operated by a utility and are distributed among residential, commercial, and industrial consumers of electricity. Such EG systems may include solar photovoltaic (PV), solar thermal, wind technologies, and biomass technologies. The EG systems are often connected to a utility grid. Depending on the status of the grid and possible regulations, the utility may request more or less power at certain times from the sites where the EG systems are located. A utility may incentivize a site to produce or reduce power in a number of ways, including by setting a price of electricity. The site may comply or not comply with the request from the utility, depending on a number of factors at the given time. Embodiments of the present technology address methods and systems for determining whether a site should comply with a utility request, and improvements thereof, along with other issues.

BRIEF SUMMARY

Embodiments of the present technology provide for methods and systems to control power generation and consumption in a distributed generation management system. Methods and systems may allow for analysis of current regulatory and economic incentives for increasing or decreasing net power generated at an energy resources (ER) site. These methods and systems may also allow for estimating future regulatory and economic incentives for increasing or decreasing net power generated at an ER site. In addition, these methods and systems may also allow for estimation of future generation and consumption at an ER site. Analysis of the current and future states of the utility grid and ER site enables the ER site to realize gains and avoid losses that would not be possible without an analysis of possible future states.

Embodiments may include a method of adjusting power in a distributed generation management system. The method may include receiving, by a processor, real-time load requirement data of an ER site. The real-time load requirement data may correspond to a load requirement of the ER site. The method may also include receiving, by the processor, real-time energy generation (EG) data from the ER site. The real-time EG data may correspond to an amount of energy generated by an EG system associated with the ER site. The method may further include determining, by the processor, a net power generation at a first level from the real-time load requirement data and the real-time energy generation data. Additionally, the method may include receiving, by the processor, a first request from a utility associated with the ER site to increase or decrease the net power generation from the first level. The method may also include determining a benefit complying with the first request. The method may further include estimating a benefit of not complying with the first request. Estimating the benefit of not complying with the first request may include forecasting a second request at a future time from the utility to increase or decrease the net power generation by the EG system. The estimation may also include forecasting the net power generation to be at a second level at the future time. The estimation may further include determining from the second request and the net power generation at the second level the benefit of complying with the second request at the future time. The method may also include determining whether the determined benefit of complying with the first request is greater than the estimated benefit complying with the second request.

Embodiments may include a method of controlling an energy-consuming device. The method may include receiving, at a processor, an inquiry from the energy-consuming device on an ER site to increase energy consumed by the energy-consuming device. The method may also include determining, by the processor, a cost of the increase in energy at a first time. The method may further include estimating, by the processor, a cost of the increase in energy at a second time. Estimating the cost of the increase in energy at the second time may include forecasting a request at the second time from a utility associated with the ER site to increase or decrease power generation from the ER site. The estimation may also include forecasting a load requirement of the ER site at the second time. The estimation may further include adding the increase in energy to the load requirement of the ER site at the second time. In addition, the estimation may include forecasting a power generation from the ER site at the second time. Furthermore, the estimation may include determining the cost of the increase in energy at the second time from the request, load requirement, the increase in energy, and the power generation. The method may further include comparing, by the processor, the determined cost at the first time to the estimated cost of the second time.

Embodiments may also include a distributed generation management system. The system may include an ER site. The ER site may include an EG system and at least one of a load and an energy storage system. The ER site may be characterized by a load requirement, an energy generation, and a net power generation level. The net power generation level may be defined as the energy generation minus the load requirement. The system may also include a gateway. The system may further include a control server. The control server may be configured to receive a request from a utility to increase or decrease the net power generation level. The control server may also be configured to receive the net power generation level from the ER site through the gateway. The control server may further be configured to determine whether the benefit of complying with the request at a first time is greater than the benefit of complying with the request at a second time.

DETAILED DESCRIPTION

Embodiments of the present technology may facilitate a distributed generation management system to understand, improve, and/or optimize energy management. At any time, an energy resources (ER) site with an energy generation (EG) system may have incentives and/or disincentives to produce a certain amount of net power to send to a utility grid. The net power may be the difference between the energy generated by the EG system and the energy consumed by loads on the ER site. At a present time, the incentives and/or disincentives to produce more or less net power to send to the utility grid may be known with certainty. By contrast, the incentives and/or disincentives at a future time to produce more or less net power to send to the utility grid may not be known with certainty. If an ER site were to produce more net power at the current time, the ER site may be forfeiting the opportunity to produce more net power at a future time, when incentives, generation characteristics, or load usage may make the production of the net power more beneficial to the ER site. Put another way, without the understanding of possible future conditions, an ER site may increase benefits in the extremely near term, but the increase in benefits may be lower than potential increased improve benefits over a longer time scale.

Methods and systems described herein may provide for estimating future conditions. Estimates of the future conditions may include predicting requests from the utility for more or less power, predicting generation from the EG system, and predicting consumption on the ER site. Estimates of future conditions may include use of mathematical models. By comparing estimates of future conditions with present conditions, embodiments of the present technology may allow for an ER site to increase benefits on time scales longer than the immediate near term, and may lead to other improvements over conventional technologies.

Figure 1:
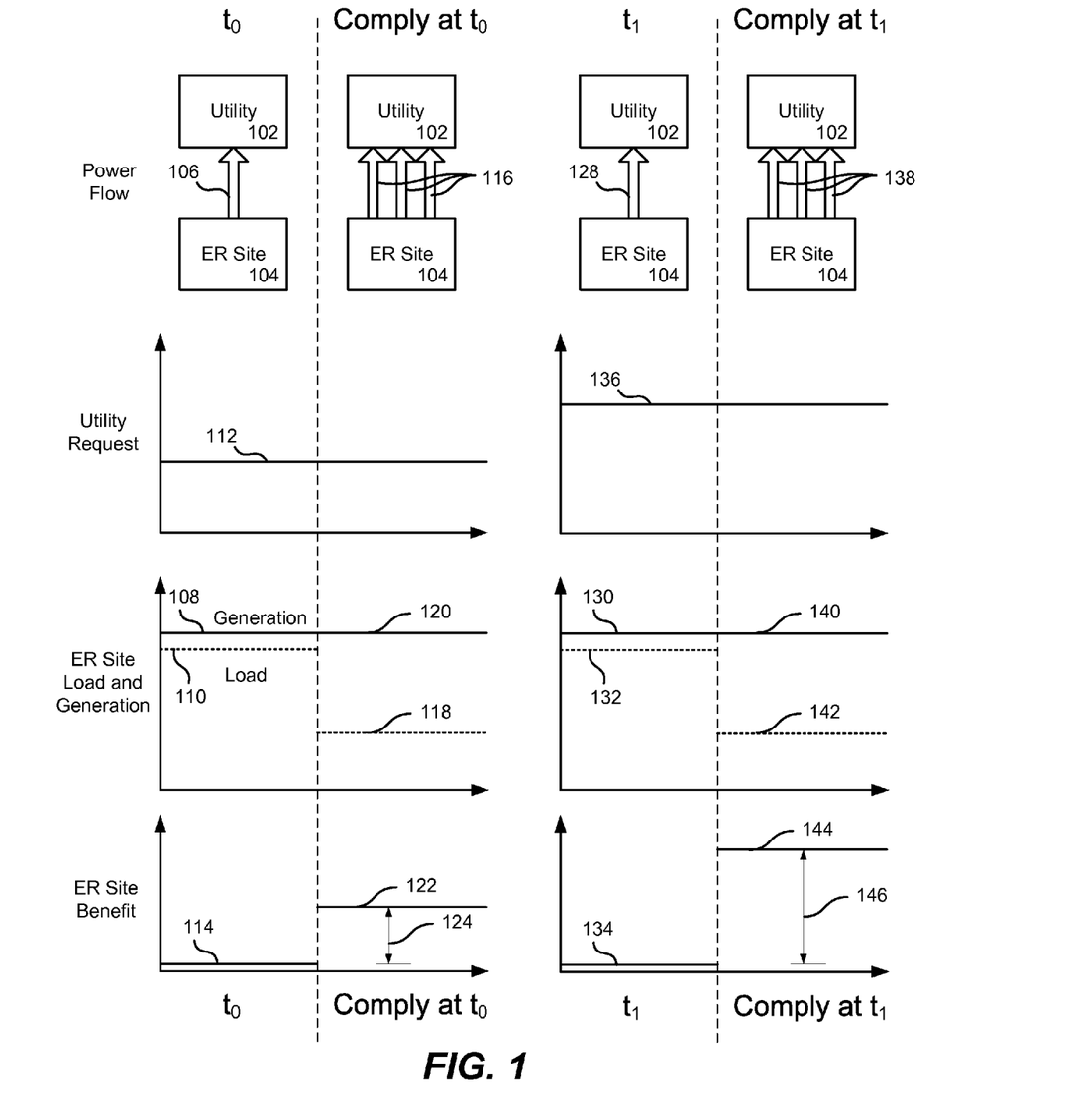
FIG. 1 is an illustration of a scenario of an energy resources (ER) site complying with a request at time $t_0$ and complying with a request at time $t_1$ according to embodiments.

Embodiments of the present technology may include determining whether the benefit of complying with a utility request to change the net power generation level is greater at a present time or at a future time. FIG. 1 graphically depicts a utility 102 and an ER site 104 at two times, $t_0$ and $t_1$, before and after complying with a utility request. The statuses and effects of power flow, utility request, ER site load and generation, and ER site benefit are also shown in FIG. 1.

The power flow from ER site 104 to utility 102 is represented by arrow 106, indicating that ER site 104 generates more power than it consumes. Graphically, energy generation by ER site 104 may be at a level represented by a line 108. This energy generation may come from on-site generation energy sources, such as photovoltaic solar cells, solar thermal, wind, biomass, hydropower, natural gas, and other sources. The energy generation may also include energy discharged from a previously charged energy storage system on the ER site. This energy storage system may include a battery, a flywheel, a capacitor, or another chemical/mechanical/electrical storage device. The load requirement for the ER site at time $t_0$ may be represented by a dashed line 110. Loads on ER site 104 may include any device that consumes energy, such as an appliance, a meter, and an energy storage system while charging. Dashed line 110 may be lower than line 108, which, like arrow 106, shows that the ER site generates more power than it consumes. In this case, power may be considered to be exported from ER site 104 to utility 102.

At time $t_0$, utility 102 may issue a request, shown as line 112. The request may be for ER site 104 to increase the power supplied by the site to the utility grid. The request may be in the form of an economic incentive. For example, the request may include a price for a kilowatt hour of electricity, or the request may be a demand for a quantity of kilowatt hours desired by utility 102.

When ER site 104 is exporting power to utility 102 given a utility request level 112, ER site 104 may receive a benefit shown by line 114. The benefit to ER site 104 may be in the form of an economic reward. For example, ER site 104 may be paid a price for each kilowatt hour of electricity sent to utility 102. This payment may occur in real time or may be considered a credit on the next utility bill for ER site 104. The magnitude of the utility request level may depend on current utility grid-wide energy demand and production, anticipated demand and production, regulatory incentives, and other factors.

Given a utility request at level 112, ER site 104 may comply with the request at time $t_0$ by producing more power to utility 102. Graphically, the increase in power flow from ER site 104 to utility 102 is depicted by a plurality of arrows 116.

One way that ER site 104 may increase the amount of power exported to utility 102 is to decrease the load while maintaining generation. For example, load may be decreased to a level 118 while maintaining energy generation at a level 120. ER site 104 may decrease the load by turning off or turning down an energy-consuming device. For example, load may be decreased by turning down a heater, an air conditioner, a water heater, or an appliance. The load may also be decreased by pausing the charging of an energy storage device.

By cutting the load and increasing power exported to the utility grid, ER site 104 provides more electricity at utility request level 112. This results in a benefit to ER site 104 at a level 122, which is greater by a net amount 124 than previous level 114. Oftentimes, the amount of power sent to utility 102 from ER site 104 may not be a significant portion of the total amount of power demanded by utility 102. Thus, the utility request may not change from level 112 as a result of ER site 104 complying with the request.

Even though ER site 104 received net benefit 124 from complying with the utility request at time $t_0$, ER site 104 may receive a larger net benefit if ER site 104 does not comply at time $t_0$ but instead complies at a future time $t_1$. At time $t_1$, many parameters may be similar to time $t_0$. For example, ER site 104 may be exporting power 128 to utility 102 in a similar amount as at $t_0$. Likewise, the ER site may have a generation level 130 and a load level 132 similar to or the same as at time $t_0$. Similarly, ER site 104 may have a benefit at a level 134 similar to what the same as at time $t_0$.

One difference at time $t_1$ may be the magnitude of the utility request. The utility request, represented by line 136, may be larger than the utility request at time $t_0$ shown as line 112. A larger magnitude utility request may manifest as a higher economic incentive offered for power or an increase in the total amount of power desired by utility 102. The higher economic incentive may be a result of increased grid-wide demand for power or a decrease in grid-wide energy generation.

ER site 104 may have the same ability to increase the export of power to utility 102 at time $t_1$ as at time $t_0$. For example, power flow 138 may be similar to or the same as power flow 116. Energy generation level 140 may be similar to energy generation level 120. Likewise, load may be cut to level 142, which may be similar to level 118. Even with these similar conditions, because of the higher utility request 136, ER site 104 may receive a benefit at a level 144 from complying with the utility request at time $t_1$. Complying with the requested at time $t_1$ may result in a net benefit 146 as compared to before complying with the request. Net benefit 146 may be larger than net benefit 124.

With a larger benefit at time $t_1$ compared to at time $t_0$, ER site 104 should comply at time $t_1$ instead of at time $t_0$. A difficulty is that at time $t_0$, ER site 104 and/or utility 102 do not know with certainty what ER site generation levels, ER site load levels, or utility request levels will be at time $t_1$. Without this information or without the ability to predict this information, ER site 104 may comply with the request at time $t_0$ to receive net benefit 124 instead of reaping a larger net benefit 146 by complying at time $t_1$.

Figure 2:
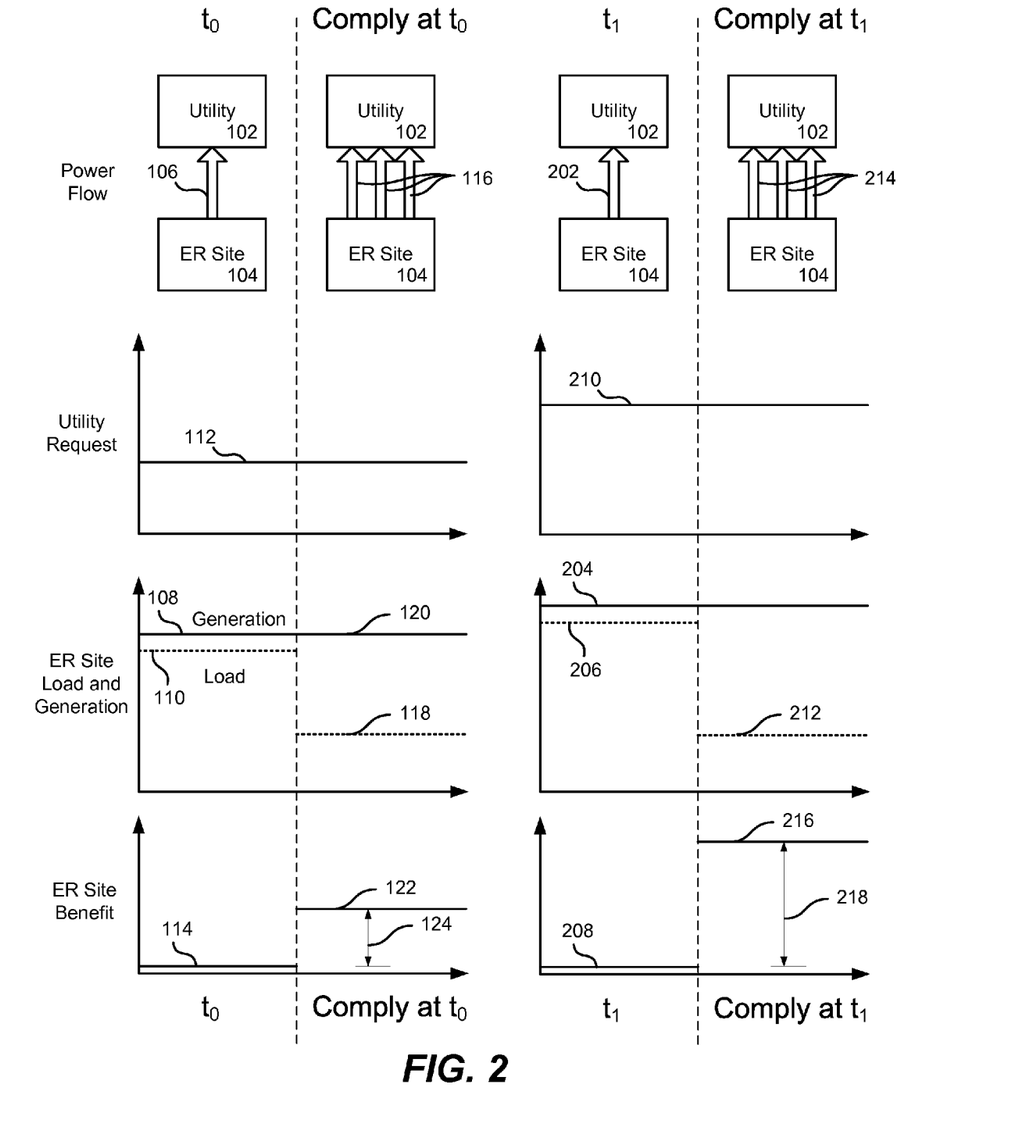
FIG. 2 is an illustration of a scenario of an ER site complying with a request at time $t_0$ and complying with a request at time $t_1$ according to embodiments.

FIG. 2 illustrates another scenario when complying at a later time $t_1$ will result in a greater benefit than when complying at time $t_0$. At time $t_0$, conditions in FIG. 2 are the same as at time $t_0$ in FIG. 1. At time $t_1$, ER site 104 may be exporting power 202 to utility 102. The power exported may be a similar amount as at time $t_0$, but the net power may result from a higher generation level 204 and a higher load level 206. The benefit to ER site 104 may be at a level 208 similar to level 114 at time $t_0$. At time $t_1$, utility 102 may issue a higher request 210 for power than request 112 at time $t_0$.

The higher energy generation at level 204 may be the result of increased energy source availability at time $t_1$. For instance, if the energy generation system includes a photovoltaic panel, then increased energy generation may result from solar intensity. If the energy generation system includes a wind turbine, then increased energy generation may result from increased wind speed. Increased load at level 206 may result from increased energy demand from appliances and other energy-consuming devices.

ER site 104 may comply with the utility request at time $t_1$ by decreasing the load to a level 212. Level 212 may be the same as level 118. ER site 104 could run at a lower load level by running at a similar condition as when complying with the request at time $t_0$. Alternatively, ER site 104 may be able to decrease the load to level 212 by increasing the load after time $t_0$ but before time $t_1$, when the utility request may not be as high as level 210. As an example, ER site 104 may run a water heater before time $t_1$ and after time $t_0$, so that the water heater does not need to operate after time $t_1$. In some examples, the load may be one that normally runs with no or minimal user input, such as a refrigerator or HVAC system. In some examples, the load may include one that normally runs with some user input, such as a washing machine, a dryer, or a dishwasher, but can be configured to run differently based on the comparison of the determined benefit and the estimated benefit of running at time $t_0$ or at time $t_1$.

With the higher generation level 204 with the same load level 212 at time $t_1$ as at time $t_0$, more power may be exported to utility 102. This increased power export may be represented by arrows 214. At a higher utility request and with the increased export, ER site 104 may have a benefit at level 216, resulting in a net benefit amount 218. Net benefit amount 218 may be greater than net benefit amount 124. Thus, ER site 104 should comply with utility request at time $t_1$ instead of at time $t_0$. However, similar to as discussed above, ER site 104 would need to be able to predict conditions at a later time than at time $t_0$.

Figure 3:
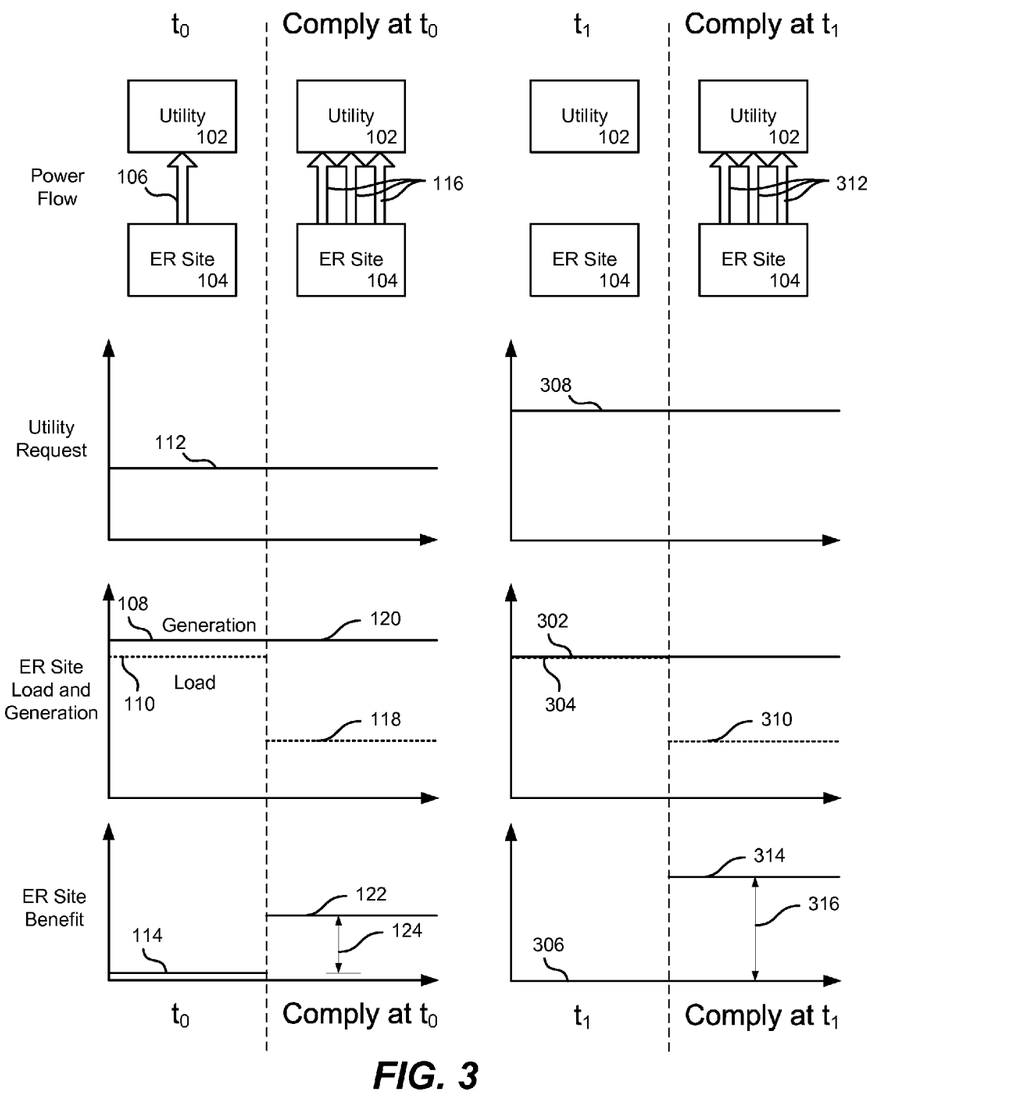
FIG. 3 is an illustration of a scenario of an ER site complying with a request at time $t_0$ and complying with a request at time $t_1$ according to embodiments.

FIG. 3 shows an example of another utility request scenario. At time $t_0$, conditions in FIG. 3 are the same as at time $t_0$ in FIG. 1. At time $t_1$, ER site 104 may not be exporting power to utility 102. Generation from ER site 104 may be at a level 302, which is about the same as a level 304 of the load required. Without an export of power, ER site 104 receives a benefit at a level 306, which is about zero.

Utility 102 may issue a request at a level 308 for more power to be exported by ER site 104. Level 308 may be higher than level 112 at time $t_0$. Even though ER site 104 is not exporting any power at $t_1$, ER site 104 may cut the load from level 304 to a level 310. Level 310 may be the same as level 118 at time $t_0$.

The power export may be represented by arrows 312. At a higher utility request, ER site 104 may have a benefit at level 314, resulting in a net benefit amount 316. Net benefit amount 316 may be greater than net benefit amount 124. Thus, ER site 104 should comply with utility request at time $t_1$ instead of at time $t_0$. However, similar to the scenarios discussed above, ER site 104 would need to be able to predict conditions at a later time than at time $t_0$.

Figure 4:
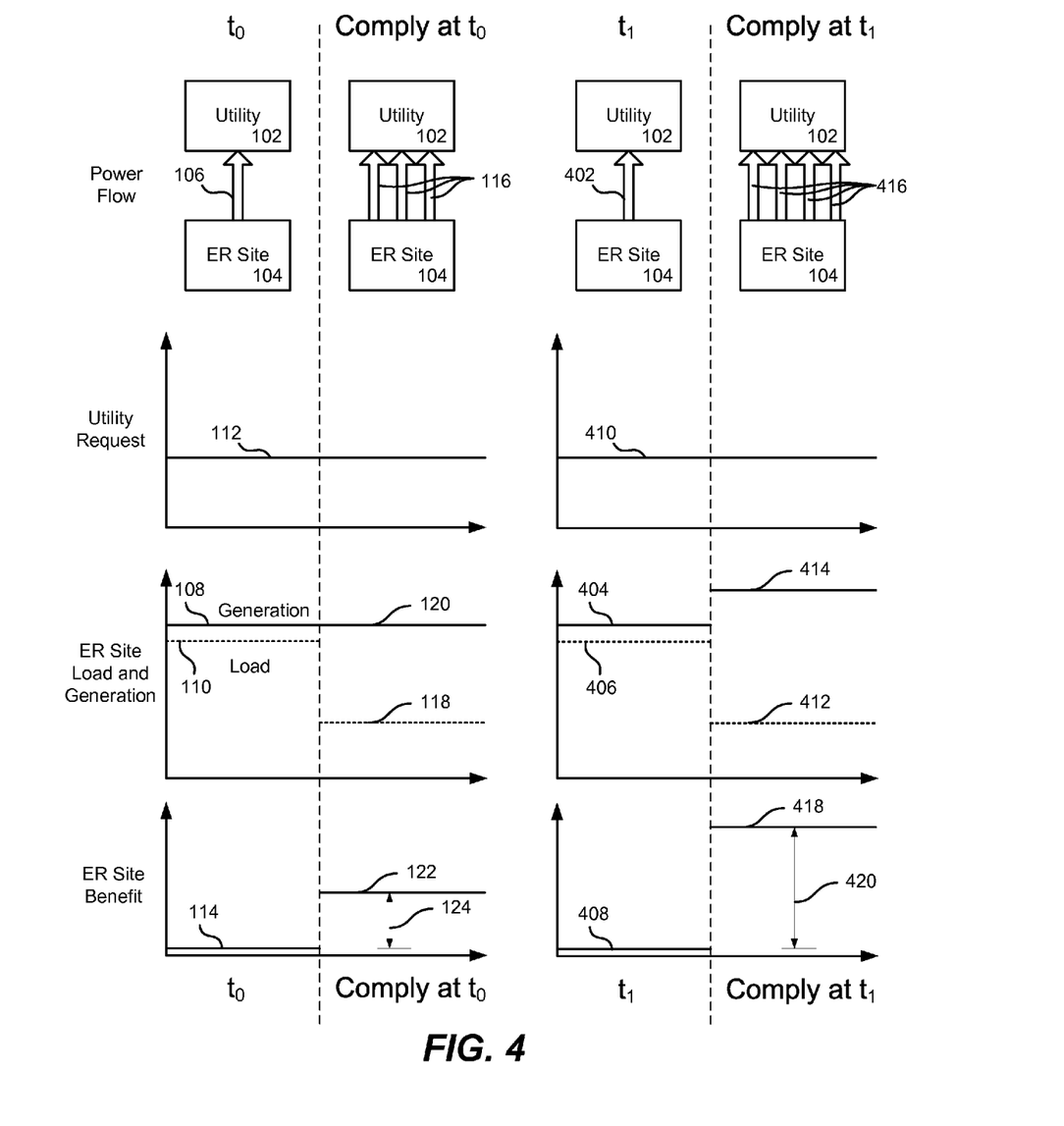
FIG. 4 is an illustration of a scenario of an ER site complying with a request at time $t_0$ and complying with a request at time $t_1$ according to embodiments.

Another scenario when complying at a later time $t_1$ will result in a greater benefit than when complying at time $t_0$ is illustrated by FIG. 4. At time $t_0$, conditions in FIG. 2 are the same as at time $t_0$ in FIG. 1. At time $t_1$, ER site 104 may be exporting power 402 to utility 102. The power exported may be a similar amount as at time $t_0$. The generation may be at a level 404, and the load may be at a level 406, both of which are similar to the levels at time $t_0$. The benefit to ER site 104 may be at a level 408 similar to level 114 at time $t_0$. At time $t_1$, utility 102 may issue a request 410 for power similar to request 112 at time $t_0$.

To comply with the utility request at time $t_1$, ER site 104 may decrease load to a level 412, which may be similar to level 118. ER site 104 may also be able to increase generation to a level 414. Increasing generation may be possible by discharging an energy storage system at ER site 104. For instance, a battery that is fully charged may be discharged to export more power to the grid. Discharging an energy storage system may not be possible at time $t_0$ because the energy storage system may not be charged or fully charged at that time. Generation may also be increased by adjusting the efficiency of a PV inverter.

The increased power export, represented by arrows 416 may result in a benefit at a level 418 to ER site 104. Benefit level 418 may be greater than benefit level 122 and may result in a net benefit amount 420. Net benefit amount 420 may be greater than benefit amount 124. Thus, ER site 104 should comply with utility request at time $t_1$ instead of at time $t_0$. However, similar to as discussed above, ER site 104 would need to be able to predict conditions at a later time than at time $t_0$. For instance, net benefit amount 420 from complying with the request at $t_1$ depends on the level 410 of the utility request at time $t_1$, and the utility request may not be known with certainty to be at a level similar to level 112 at time $t_0$. Additionally, ER site 104 would need to predict that an energy storage system would have available energy to discharge at time $t_1$.

The scenarios explained in FIGS. 1-4 describe scenarios when an ER site should delay complying with a utility request at an earlier time and instead comply with the utility request at a later time. FIGS. 1-4 illustrate example scenarios. Perhaps as likely as the scenarios in FIGS. 1-4 are scenarios similar to those in FIGS. 1-4, except that time $t_1$ may be an earlier time than time $t_0$. In those modified scenarios, the ER site would have a larger benefit by complying with the utility request at the earlier time than at the later time. Without a method to predict utility requests, energy generation, and/or loads with sufficient confidence in the future, conventional distributed management systems may simply seek to increase benefit to the ER site at the present time or in the short-term and may not consider longer-term implications. The present technology described herein addresses these and other issues.

Example System Environment

Figure 5:
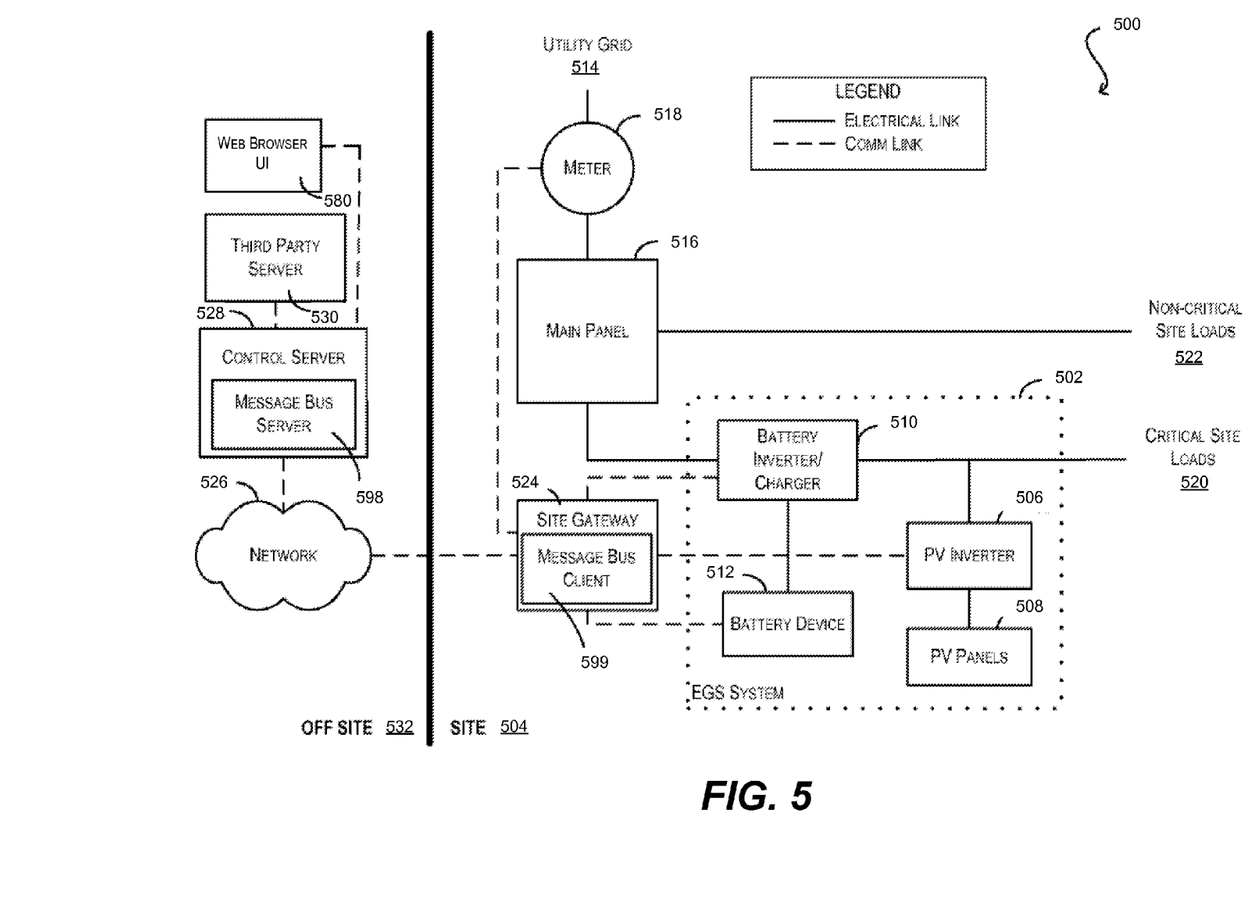
FIG. 5 is a simplified block diagram of a system environment according to embodiments.

FIG. 5 is a simplified block diagram of a system environment 500 according to an embodiment of the present invention. As shown, system environment 500 includes an energy generation and storage (EGS) system 502 that is installed at a site 504 (e.g., a residence, a commercial building, etc.). Site 504 may be called an energy resources site. EGS system 502 includes a PV-based energy generation subsystem comprising a PV inverter 506 and one or more PV panels 508, and a battery-based energy storage subsystem comprising a battery inverter/charger 510 and a battery device 512. In some embodiments, PV inverter 506 and battery inverter/charger 510 can be combined into a single device. As discussed later, battery inverter/charger 510 and battery device 512 are optional components. In the example of FIG. 5, EGS system 502 is grid-connected; thus, PV inverter 506 and battery inverter/charger 510 are electrically connected to a utility grid 514 via a main panel 516 and a utility meter 518. Further, to provide power to site 504, utility grid 514, PV inverter 506, and battery inverter/charger 510 are electrically connected to critical site loads 520 and non-critical site loads 522. In embodiments that do not include PV-based energy generation, analogous meters, control systems, and other devices may be used instead of those in EGS system 502.

Integrated EGS systems such as system 502 provide a number of advantages over energy generation systems that do not incorporate any on-site energy storage. For example, excess energy produced by PV components 506 and 508 can be stored in battery device 512 via battery inverter/charger 510 as a critical reserve. Battery inverter/charger 510 can then discharge this reserved energy from battery device 512 when utility grid 514 is unavailable (e.g., during a grid blackout) to provide backup power for critical site loads 520 until grid power is restored. In addition, energy from battery device 512 may be discharged when utility grid 514 has a need for more energy. Utility grid 514 may send out a request for more energy, which may be in the form of an economic incentive. As discussed above, the energy storage system may include storage technologies other than a battery. Although not shown in FIG. 5, battery device 512 and/or battery inverter/charger 510 may include a meter that measures the energy stored in battery device 512.

Centralized management of EGS systems such as system 502 can be difficult, particularly at the large scale needed for the residential and commercial markets. To address this, system environment 500 can include a site gateway 524 and a control server 528. Site gateway 524 is a computing device (e.g., a general purpose personal computer as shown in FIG. 5, a dedicated device, etc.) that is installed at site 504. As shown, site gateway 524 is communicatively coupled with on-site components 506, 510, 512, and 518, as well as with control server 528 via a network 526. In one embodiment, site gateway 524 can be a standalone device that is separate from EGS system 502. In other embodiments, site gateway 524 can be embedded or integrated into one or more components of system 502. Additionally, site gateway 524 may be communicatively coupled with one or more EGS systems 502. For example, in a residential setting, site gateway 524 may be a single gateway for a neighborhood. Control server 528 is a server computer (or a cluster/farm of server computers) that is remote from site 504. Control server 528 may be operated by, e.g., the installer or service provider of EGS system 502, a utility company, or some other entity.

In one embodiment, site gateway 524 and control server 528 can carry out various tasks for monitoring the performance of EGS system 502. For example, site gateway 524 can collect system operating statistics, such as the amount of PV energy produced (via PV inverter 506), the energy flow to and from utility grid 514 (via utility meter 518), the amount of energy stored in battery device 512, the energy used by critical site loads 520 and non-critical site loads 522, and so on. Site gateway 524 can then send this data to control server 528 for long-term logging, system performance analysis, and for inputs into predictive performance models.

More significantly, site gateway 524 and control server 528 can operate in tandem to actively facilitate the deployment and control of EGS system 502. Specifically, FIG. 5 shows other entities remote from the site (OFF SITE 532) that may communicate with the EGS system. These other entities include a web server 580, a database server 582, and a third party server 530.

According to embodiments, communication between the various elements involved in power management (e.g., between the centralized control server and the various devices at the remote site, and/or between the centralized control server 528 and various other remote devices such as a database server, web server, etc.) may be achieved through use of a power management Message Bus System (MBS). The MBS is implemented utilizing a message bus server 598, and a message bus client 599 located at the site gateway. In FIG. 5, the message bus server is shown as being on the control server 528, but this is not required and in some embodiments the message bus server could be on a separate machine and/or part of a separate server cluster. Additional details of system 500 can be found in U.S. application Ser. No. 14/697,353, filed Apr. 27, 2015, which is herein incorporated by reference for all purposes.

Embodiments may include a system without battery inverter/charger 510 and without battery device 512, making the EGS system an EG system. Critical site loads 520 and non-critical site loads 522 may be devices that consume electricity from PV panels 508 or from utility grid 514. Critical site loads 520 and non-critical site loads 522 may include meters that monitor the energy consumed by the loads. Additionally, critical site loads 520 and non-critical site loads 522 may include control systems that allow a gateway, a processor, or a computer system, to increase or decrease energy consumption by the loads. The load requirements of site 504 may vary throughout the day. Under typical operating conditions, control server 528, site gateway 524, meter 518, and EGS system 502 communicate to control the output level of the EGS system. If, for example, EGS system 502 is producing more electricity than required by the loads, site 504 will have a surplus of electricity and may need to send the electricity to utility grid 514.

Example Methods

Figure 6:
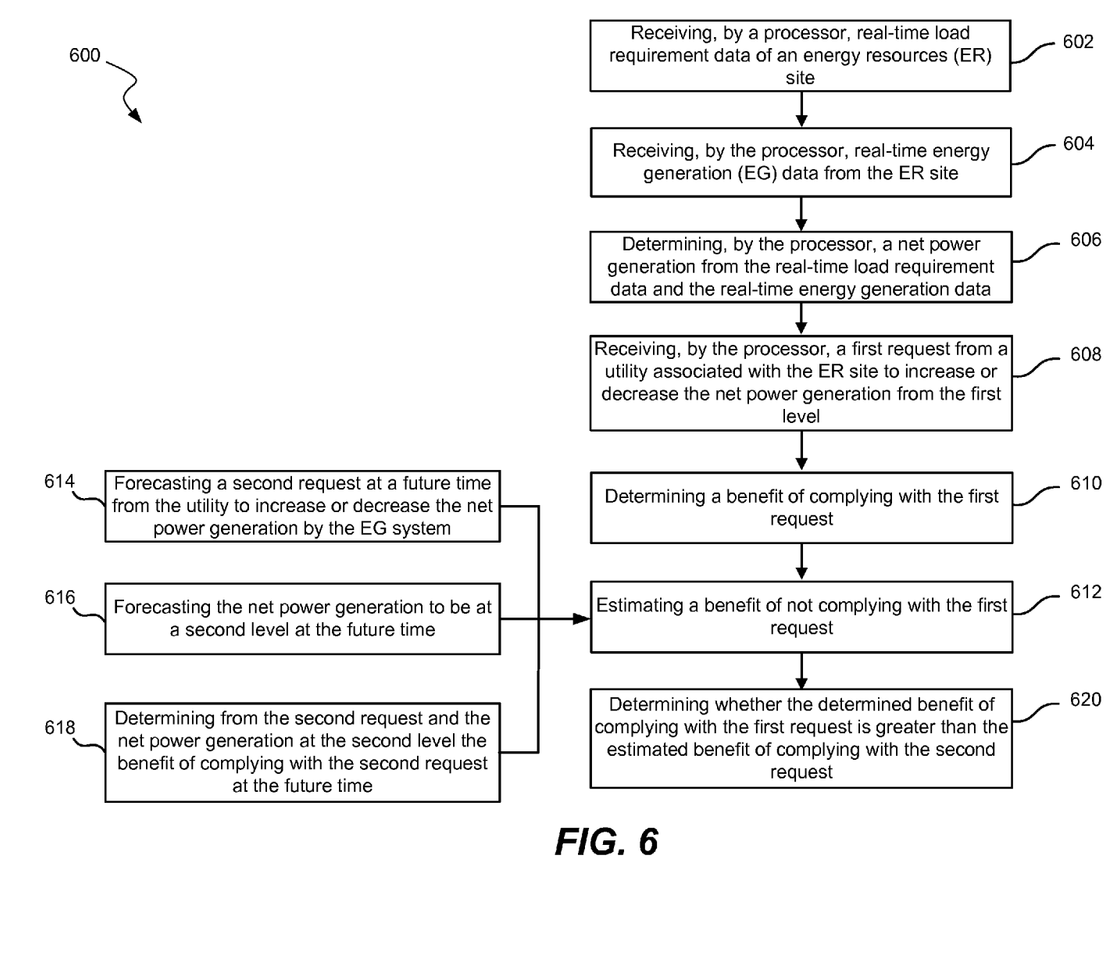
FIG. 6 is a block flow diagram of a method of adjusting power in a distributed management system according to embodiments.

As shown in FIG. 6, embodiments may include a method 600 of adjusting power in a distributed generation management system. Method 600 may include receiving, by a processor, real-time load requirement data of an ER site 602. The real-time load requirement data may correspond to a load requirement of the ER site. Method 600 may also include receiving, by the processor, real-time EG data from the ER site 604. The real-time EG data may correspond to an amount of energy generated by an EG system associated with the ER site. The EG system may be a photovoltaic system. The processor may be part of a control server. The control server may not be located on the ER site.

Method 600 may further include determining, by the processor, a net power generation at a first level from the real-time load requirement data and the real-time energy generation data 606. The net power generation may be calculated by subtracting the real-time load requirement data from the real-time energy generation data. If the net generation is positive than the EG system exports power to the utility grid.

Additionally, method 600 may include receiving, by the processor, a first request from a utility associated with a ER site to increase or decrease the net power generation from the first level 608. The first request from the utility may be associated with an economic incentive. For example, the economic incentive may be a higher price of electricity or a credit for electricity.

Method 600 may also include determining a benefit complying with the first request 610. The benefit of complying with the first request may include incentives or disincentives imposed by entities other than the utility. For example, a benefit may be a renewable energy credit issued by a government. Complying with the first request may include decreasing or increasing the amount of energy generated. Decreasing the amount of energy generated may include adjusting an electrical characteristic of a PV inverter. Increasing the amount of energy generated may include discharging an energy storage device. In addition, complying with the first request may include decreasing or increasing the load requirement. Decreasing the load requirement may include powering down an appliance. Increasing the load requirement may include powering up an appliance or storing power in a battery. Complying with the first request may include a combination of adjusting the amount of energy generated and the load requirement.

Method 600 may further include estimating a benefit of not complying with the first request 612. Estimating the benefit of not complying with the first request may include forecasting a second request at a future time from the utility to increase or decrease the net power generation by the EG system 614. Forecasting the second request may include using current or historical weather data to estimate utility-wide power needs or analyzing historical electricity price data. Historical data may be analyzed for a particular time of day, day of the year, or week of the year.

The estimation may also include forecasting the net power generation to be at a second level at the future time 616. Forecasting the net power generation may include estimating the load requirement at the future time from weather data and programmed setpoints for ER site loads. For a load such as a building's cooling system, programmed setpoints may include temperatures set for certain hours of day, tuned for the building's occupants' comfort level. In these and other embodiments, the ER site may include a building, and forecasting the net power generation may include estimating the load requirement at the future time based on dimensions of the building. Estimating the load requirement may include parameters such as building heat capacities and heat transfer coefficients. Estimating the load requirement may also include using expected behavior based on historical or probabilistic models.

Forecasting may include forecasting the net power generation to be at multiple levels or a range of levels. Using the possible different levels of net power generation may improve the analysis of a potential scenario at the future time. A probability may be associated with each net power generation level or a probability distribution may be associated with the range of levels. For example, the net power generation may be forecasted to be a given probability distribution centered around a single level. The probability distribution may be based on historical data for the ER site or for other sites.

Figure 9:
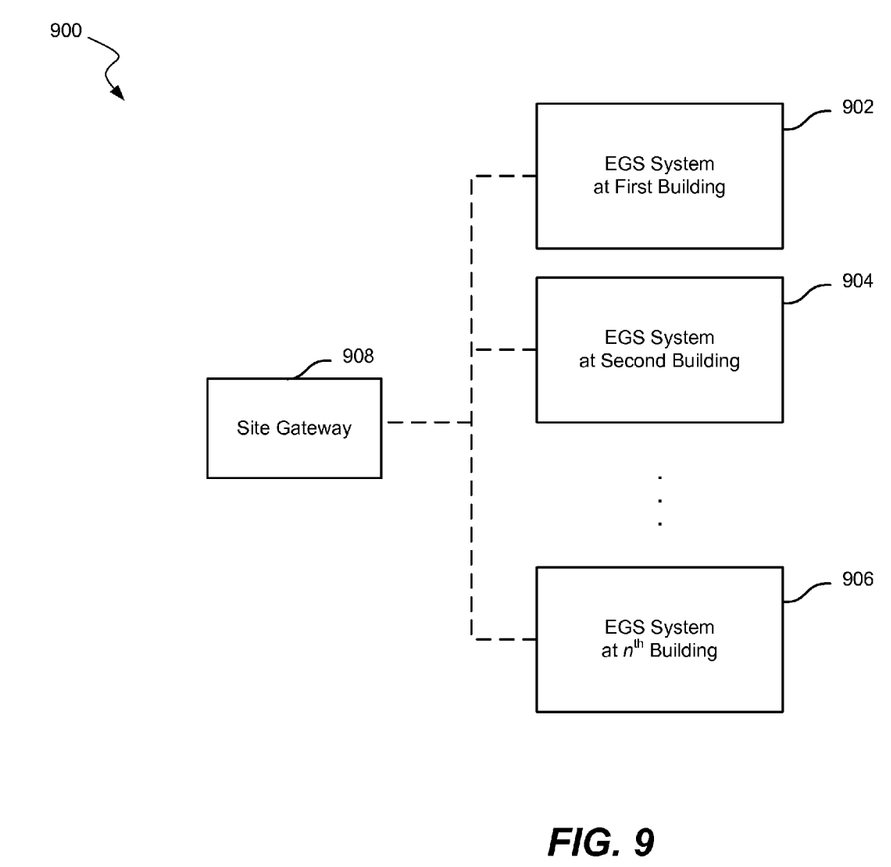
FIG. 9 is a simplified block diagram of an ER site that includes a plurality of buildings according to embodiments.

In some cases, the ER site may include a plurality of buildings. For example, the plurality of buildings may be in a neighborhood, a subdivision, a commercial zone, an industrial zone, or a residential zone. Forecasting the net power generation may also then include estimating the load requirements at a future time based on dimensions of a building or each building of the plurality of buildings. FIG. 9 shows an ER site 900 that includes n buildings, where n is a positive integer greater than or equal to 2. The ER site may include an EGS system at a first building 902 and an EGS system at a second building 904. An EGS system 906 may be present for the $n^{th}$ building at the site. The EGS systems in FIG. 9 may be similar to EGS system 502. Components in the EGS systems in FIG. 9 may be communicatively coupled to site gateway 908, similar to the coupling of components of EGS system 502 to site gateway 524. Site gateway 908 may be similar to site gateway 524. Additionally or alternatively, an individual EGS system in FIG. 9 may also include its own gateway. A building of the n buildings may also include non-critical and critical site loads.

The estimation may further include determining from the second request and the net power generation at the second level the benefit of complying with the second request at the future time 618. Complying with the second request may include decreasing or increasing the amount of energy generated by the EG system at the future time. Additionally, complying with the second request may include decreasing or increasing the load requirement of the ER site. Furthermore, complying with the second request may involve a combination of adjusting the energy generated and adjusting the load requirement.

Method 600 may also include determining whether the determined benefit of complying with the first request is greater than the estimated benefit complying with the second request 620. If the determined benefit of complying with the first request is greater than the estimated benefit of complying with the second request, then the method may include complying with the first request. If the estimated benefit of complying with the second request is greater than the determined benefit of complying with the first request, the method may include complying with the second request.

If the ER site includes a plurality of buildings, the determination of whether the determined benefit is greater than the estimated benefit may differ when considering an individual building versus the plurality of buildings as a whole. For example, an individual building may have a fairly constant net power generation so that the individual building would not much or any difference in the determined benefit versus the estimated benefit and accordingly may just comply with the first request. On the other hand, the other buildings in the plurality of buildings may have a greater net power generation at the future time. The benefits of complying with the second request for the entirety of the plurality of buildings at the future time may then outweigh the benefit of complying with the second request. Complying with the second request for the plurality of buildings may also benefit the individual building. The second request may include additional benefits for more net power generation (e.g., greater economic benefits for units of power above a threshold amount). Moreover, the plurality of buildings may have an agreement that divides up benefits from complying with requests in a way that may be favorable to the individual building.

The method may include communicating to a user at least one of the determined benefit of complying with the first request and the estimated benefit of complying with the second request. Determining the relative benefits may include setting a minimum confidence level. For example, complying with the second request may only be determined to have a greater benefit than complying with the first request if the confidence level is greater than 95%, 90%, 85%, or 80% in embodiments. The user may be prompted to choose whether to comply with the first request.

In some embodiments, the user may grant permission to automatically comply with whatever request the processor determines has greater benefits. In this manner, the user may not be prompted to choose between compliance options, and the user may not receive a communication regarding the determined benefit and the estimated benefit.

The second request may be at a time minutes, hours, or days ahead of the first request. Estimating and forecasting may continue for a third request, a fourth request, and so on. The third requests and onward may be for additional times in the future. The future time considered may not be an instant in time, but rather a time interval. For example, the time interval may be 15 minutes, 30 minutes, or 60 minutes in embodiments. The method may include automatically complying with the second request when the second request is received under conditions similar to those used in the estimation.

Figure 7:
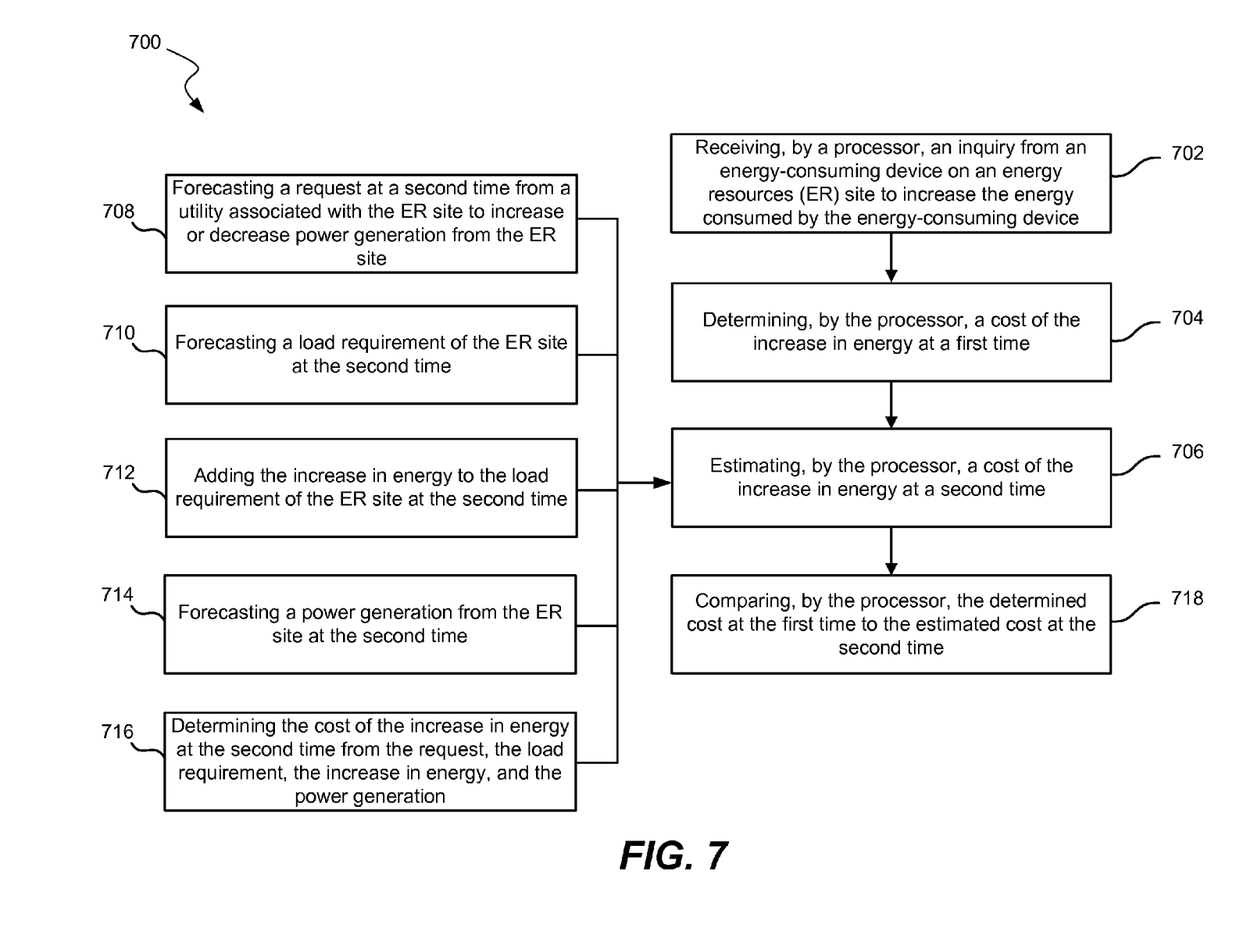
FIG. 7 is a block flow diagram of a method of controlling an energy-consuming device according to embodiments.

Embodiments may include a method of controlling an energy-consuming device, as shown in method 700 in FIG. 7. Method 700 may include receiving, at a processor, an inquiry from the energy-consuming device on an ER site to increase energy consumed by the energy-consuming device 702. As an example, a user may decide to start a dishwasher. Before the dishwasher starts a cleaning cycle, the dishwasher may send a message to a processor that the dishwasher is about to consume more energy. The processor may be part of a gateway or control server.

Method 700 may also include determining, by the processor, a cost of the increase in energy at a first time 704. In the dishwasher example, the cost of the increase in energy may be calculated by the current price of electricity and the estimated kilowatt hours necessary to complete a cleaning cycle.

Method 700 may further include estimating, by the processor, a cost of the increase in energy at a second time 706. The request at the second time may be associated with an economic incentive, as discussed earlier. Estimating the cost of the increase in energy at the second time may include forecasting a request at the second time from utility associated with the ER site to increase or decrease power generation from the ER site 708. Forecasting the request may be done in any manner previously described. The estimation may also include forecasting a load requirement of the ER site at the second time 710. Forecasting the load requirement may be carried out by any method described herein. The estimation may further include adding the increase in energy to be load requirement of the ER site at the second time 712. The estimation may also include forecasting a power generation from the ER site at the second time 714. Forecasting the power generation may be accomplished in any way described herein. Method 700 may further include determining the cost of the increase in energy at the second time from the request, the load requirement, the increase in energy, and the power generation 716.

Method 700 may further include comparing, by the processor, the determined cost at the first time to the estimated cost of the second time 718. If the determined cost at the first time is less than the estimated cost at the second time, the method may include powering up the energy-consuming device after the first time and before the second time. If the determined cost at the second time is less than the determined cost at the first time, then the method may include powering up the energy-consuming device at the second time. Similar to what has been previously described, determining that a future cost is less than a present cost may require a minimum confidence level. In an example with a dishwasher, if the determined cost at the second time is less than the determined cost at the first time, the dishwasher may communicate this information to the user and give the user the option to delay starting the dishwasher at the second time.

Example Systems

Embodiments may also include a distributed generation management system the system may include an ER site. The ER site may include an EG system and at least one of a load and an energy storage system. The ER site may be characterized by a load requirement, an energy generation, and a net power generation level. The net power generation level may be defined as the energy generation minus the load requirement. The system may also include a gateway. The gateway may include a processor that may carry out a portion of the computations necessary to estimate costs or benefits at future times.

The system may further include a control server. The control server may be configured to receive a request from a utility to increase or decrease the net power generation level. Control server may also be configured to receive the net power generation level from the EG system through the gateway. Control server may further be configured to determine whether the benefit of complying with the request at a first time is greater than the benefit of complying with the request at a second time. The control server may be configured to send an instruction to the EG system to increase or decrease generation based on the determination of the benefits at the first time and the second time. Furthermore, the control server may be configured to send an instruction to the load or energy storage system to increase or decrease the consumption of energy.

Loads in the ER site may equipped with meters to track load requirements. In addition, loads may be equipped with control systems or control circuitry to allow a remote processor to power up or power down the load. A load may include a processor that may carry out a portion of the computations necessary to estimate costs or benefits at future times. The energy storage device may also have a similar meter, control system, and processor. The PV inverter may include a meter that measures the energy generated by the PV panel. The control server may receive data regarding current weather from sensors on the ER site or from the Internet.

Example System Architecture

Figure 8:
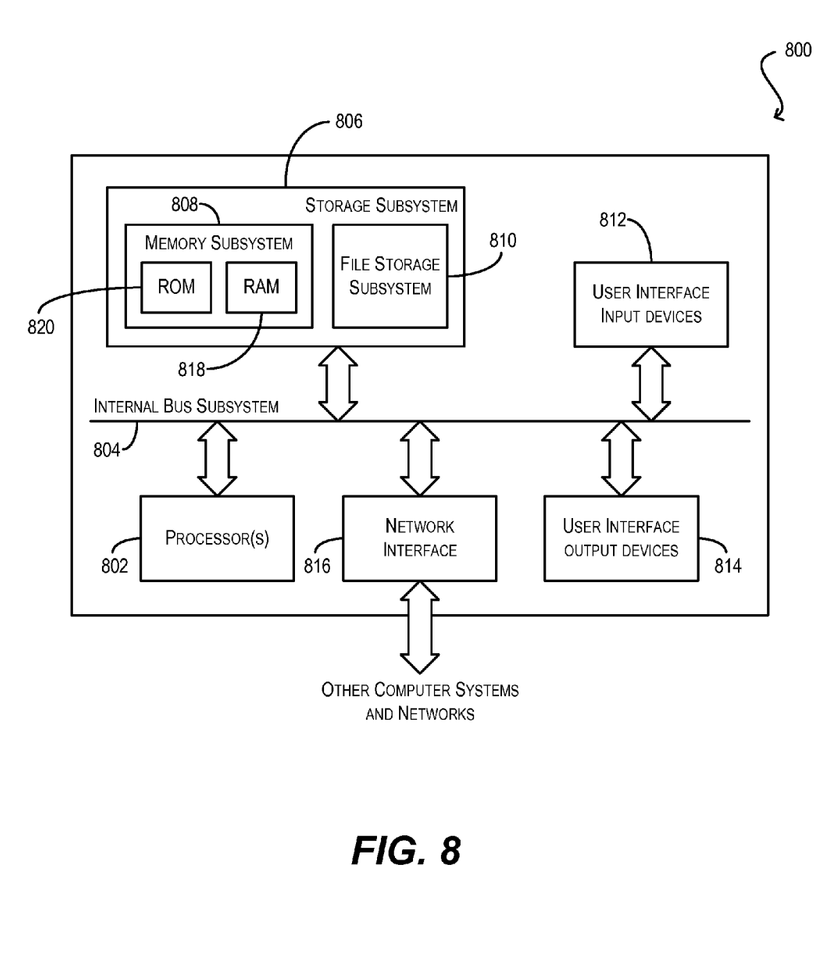
FIG. 8 is a simplified block diagram of a computer system according to embodiments.

FIG. 8 is a simplified block diagram of a computer system 800 according to an embodiment of the present invention. Computer system 800 can be used to implement any of the computer systems/devices (e.g., site gateway 524, control server 528, third-party server 530) described with respect to FIG. 5. As shown in FIG. 8, computer system 800 can include one or more processors 802 that communicate with a number of peripheral devices via a bus subsystem 804. These peripheral devices can include a storage subsystem 806 (comprising a memory subsystem 808 and a file storage subsystem 810), user interface input devices 812, user interface output devices 814, and a network interface subsystem 816.

Internal bus subsystem 804 can provide a mechanism for letting the various components and subsystems of computer system 800 communicate with each other as intended. Although internal bus subsystem 804 is shown schematically as a single bus, alternative embodiments of the bus subsystem can utilize multiple buses.

Network interface subsystem 816 can serve as an interface for communicating data between computer system 800 and other computer systems or networks (e.g., network 526 of FIG. 5). Embodiments of network interface subsystem 816 can include wired interfaces (e.g., Ethernet, CAN, RS232, RS485, etc.) or wireless interfaces (e.g., ZigBee, Wi-Fi, cellular, etc.).

User interface input devices 812 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 800.

User interface output devices 814 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 can include a memory subsystem 808 and a file/disk storage subsystem 810. Subsystems 808 and 810 represent non-transitory computer-readable storage media that can store program code and/or data that provide the functionality of embodiments of the present invention.

Memory subsystem 808 can include a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

Processor 802 may be a processor used to receive control messages in the methods described herein. In these cases, processor 802 and parts or all of computer system 800 may be in electrical communication with the EG system. For example, processor 802 may be in electrical communication with PV inverter 506. Processor 802 may carry out computations to model energy generated and consumed by the EG system to predict future levels of generation and consumption. Also, processor 802 may carry out computations to model utility requests to predict future utility requests for energy to be sent to the utility grid.

In these and other embodiments, processor 802 may send a control message to the EG system. For instance, processor 802 and parts or all of computer system 800 may be a part of control server 528. In embodiments, web browser UI 580 may appear on user interface output devices 814. In some embodiments, site gateway 524 may include some or all of computer system 800.

Computer system 800 is illustrative and not intended to limit embodiments of the present technology. Many other configurations having more or fewer components than system 800 are possible. Computer system 800 may be in electrical communication with various components of FIG. 5 and such configurations would be recognized by those with skill in the art with the benefit of this disclosure.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the EG system" includes reference to one or more EG systems and equivalents thereof known to those skilled in the art, and so forth. The invention has now been described in detail for the purposes of clarity and understanding. However, it will be appreciated that certain changes and modifications may be practice within the scope of the appended claims.

What is claimed is:

1. A method of adjusting power in a distributed generation management system, the method comprising:

receiving, by a processor, real-time load requirement data from a site gateway of an energy resource (ER) site, the real-time load requirement data corresponding to a load requirement of the ER site;

receiving, by the processor, real-time energy generation (EG) data from an inverter on the ER site, the real-time EG data corresponding to an amount of energy generated by an EG system associated with the ER site;

determining, by the processor, a net power generation at a first level from the real-time load requirement data and the real-time energy generation data;

receiving, by the processor, a first request from a utility associated with the ER site to increase or decrease the net power generation from the first level;

determining a benefit of complying with the first request;

estimating a benefit of not complying with the first request, comprising:
  forecasting a second request at a future time from the utility to increase or decrease the net power generation by the EG system,
  forecasting the net power generation to be at a second level at the future time, and
  determining from the second request and the net power generation at the second level the benefit of complying with the second request at the future time;

determining whether the determined benefit of complying with the first request is greater than or equal to the estimated benefit of complying with the second request;

complying with the first request when the determined benefit of complying with the first request is greater than or equal to the estimated benefit of complying with the second request; and not complying with the first request when the estimated benefit of complying with the second request is greater than the determined benefit of complying with the first request, wherein:
  the site gateway is communicatively coupled to the inverter,
  the EG system is connected to a utility grid, and
  complying with the first request comprises decreasing or increasing the net power generation by:
    adjusting an electrical characteristic of the inverter,
    charging or discharging an energy storage device on the ER site, or
    decreasing or increasing the load requirement.

2. A method of adjusting power in a distributed generation management system, the method comprising:
  receiving, by a processor, real-time load requirement data of an energy resource (ER) site, the real-time load requirement data corresponding to a load requirement of the ER site;
  receiving, by the processor, real-time energy generation (EG) data from the ER site, the real-time EG data corresponding to an amount of energy generated by an EG system associated with the ER site;
  determining, by the processor, a net power generation at a first level from the real-time load requirement data and the real-time energy generation data;
  receiving, by the processor, a first request from a utility associated with the ER site to increase or decrease the net power generation from the first level;
  determining a benefit of complying with the first request;
  estimating a benefit of not complying with the first request, comprising:
    forecasting a second request at a future time from the utility to increase or decrease the net power generation by the EG system,
    forecasting the net power generation to be at a second level at the future time, and
    determining from the second request and the net power generation at the second level the benefit of complying with the second request at the future time;
  determining whether the determined benefit of complying with the first request is greater than the estimated benefit of complying with the second request;
  complying with the first request upon determining that the benefit of complying with the first request is greater than the estimated benefit of complying with the second request;
  not complying with the first request upon determining that the benefit of complying with the first request is less than the estimated benefit of complying with the second request, wherein complying with the first request comprises at least one of:
    decreasing the amount of energy generated by a first amount,
    increasing the amount of energy generated by a second amount,
    decreasing the load requirement by a third amount, and
    increasing the load requirement by a fourth amount.

3. The method of claim 2, wherein complying with the second request comprises at least one of:
  decreasing the amount of energy generated by the EG system at the future time by a fifth amount,
  increasing the amount of energy generated by the EG system at the future time by a sixth amount,
  decreasing the load requirement of the ER site by the third amount, and
  increasing the load requirement of the ER site by the fourth amount.

4. The method of claim 2, further comprising:
  if the determined benefit of complying with the first request is greater than the estimated benefit of complying with the second request, complying with the first request; or
  if the estimated benefit of complying with the second request is greater than the determined benefit of complying with the first request, complying with the second request.

5. The method of claim 2, wherein forecasting the second request comprises analyzing historical electricity price data.

6. The method of claim 2, wherein forecasting the net power generation comprises estimating the load requirement at the future time from weather data and programmed setpoints for ER site loads.

7. The method of claim 2, wherein:
  the ER site comprises a building, and
  forecasting the net power generation comprises estimating the load requirement at the future time based on dimensions of the building.

8. The method of claim 2, further comprising:
  communicating to a user at least one of the determined benefit of complying with the first request and the estimated benefit of complying with the second request, and
  prompting the user to choose whether to comply with the first request.

9. The method of claim 2, wherein decreasing the amount of energy generated comprises adjusting an electrical characteristic of a photovoltaic inverter.

10. The method of claim 2, wherein increasing the load requirement comprises powering up an appliance.

11. The method of claim 2, wherein increasing the load requirement comprises storing power in a battery.

12. The method of claim 2, wherein decreasing the load requirement comprises powering down an appliance.

13. The method of claim 2, wherein decreasing the load requirement comprises releasing charge from a battery.

14. The method of claim 2, wherein the first request from the utility is associated with an economic incentive.

15. The method of claim 2, wherein determining whether the determined benefit of complying with the first request is greater than the estimated benefit of complying with the second request comprises a confidence level of greater than 80%.

16. The method of claim 2, further comprising:
communicating to a user at least one of the determined benefit of complying with the first request and the estimated benefit of complying with the second request.

17. The method of claim 2, wherein the future time is hours after the first request.

18. A method of controlling an energy-consuming device, the method comprising:
receiving, at a processor, an inquiry from the energy-consuming device on an energy resources (ER) site to increase energy consumed by the energy-consuming device;
determining, by the processor, a cost of the increase in energy at a first time;
estimating, by the processor, a cost of the increase in energy at a second time comprising:
forecasting a request at the second time from a utility associated with the ER site to increase or decrease power generation from the ER site,
forecasting a load requirement of the ER site at the second time,
adding the increase in energy to the load requirement of the ER site at the second time,
forecasting a power generation from the ER site at the second time, and
determining the cost of the increase in energy at the second time from the request, the load requirement, the increase in energy, and the power generation;
comparing, by the processor, the determined cost at the first time to the estimated cost at the second time; and
if the determined cost at the first time is less than the estimated cost at the second time, powering up the energy-consuming device after the first time and before the second time; or
if the estimated cost at the second time is less than the determined cost at the first time, powering up the energy-consuming device at the second time.

19. The method of claim 18, wherein:
the request at the second time from the utility is associated with an economic incentive, and
the estimated cost is a function of the request, the load requirement, the increase in energy, and the power generation.

20. A distributed generation management system, the system comprising:
an energy resources (ER) site comprising an energy generation (EG) system and an inverter, the EG system connected to a utility grid;
a gateway, the gateway communicatively coupled to the inverter; and
a control server comprising a processor;
wherein the processor is programmed to:
receive real-time load requirement data from the gateway of the ER site, the real-time load requirement data corresponding to a load requirement of the ER site;
receive real-time EG data from the inverter on the ER site, the real-time EG data corresponding to an amount of energy generated by the EG system;
determine a net power generation at a first level from the real-time load requirement data and the real-time EG data;
receive a first request from a utility associated with the ER site to increase or decrease the net power generation from the first level;
determine a benefit of complying with the first request;
estimate a benefit of not complying with the first request, comprising:
forecasting a second request at a future time from the utility to increase or decrease the net power generation by the EG system,
forecasting the net power generation to be at a second level at the future time, and
determine from the second request and the net power generation at the second level the benefit of complying with the second request at the future time;
determine whether the determined benefit of complying with the first request is greater than or equal to the estimated benefit of complying with the second request;
comply with the first request when the determined benefit of complying with the first request is greater than or equal to the estimated benefit of complying with the second request; and
not comply with the first request when the estimated benefit of complying with the second request is greater than the determined benefit of complying with the first request, wherein:
the processor complies with the first request by sending a control message to the EG system to:
adjust an electrical characteristic of the inverter,
charge or discharge an energy storage device on the ER site, or
decrease or increase the load requirement.

21. The system of claim 20, wherein the EG system comprises a photovoltaic system.

\* \* \* \* \*